United States Patent [19]
Nakamur

[11] Patent Number: 4,750,998
[45] Date of Patent: Jun. 14, 1988

[54] DESALTING FILTRATION DEVICE

[75] Inventor: Michishige Nakamur, Tokyo, Japan

[73] Assignee: Ishikawajima-Harima Jukogyo Kabushiki Kaisha, Tokyo, Japan

[21] Appl. No.: 871,677

[22] Filed: Jun. 6, 1986

[30] Foreign Application Priority Data

Jun. 24, 1985 [JP] Japan .................................. 60-137568

[51] Int. Cl.⁴ .............................................. C02F 9/00
[52] U.S. Cl. ..................................... 210/223; 210/266; 210/293
[58] Field of Search ............... 210/663, 669, 695, 223, 210/266, 268, 274, 283, 284, 293

[56] References Cited

U.S. PATENT DOCUMENTS

| | | | |
|---|---|---|---|
| 3,455,819 | 7/1969 | Crits | 210/274 |
| 3,575,294 | 4/1971 | Hirowatari et al. | 210/268 |
| 4,196,081 | 4/1980 | Pavia | 210/283 |
| 4,505,824 | 3/1985 | Akamine et al. | 210/223 |

*Primary Examiner*—Ivars Cintins

[57] ABSTRACT

A screen main body extends in a vessel of desalting-filtration device to section the interior of the vessel into an upper chamber in communication with an inlet through which a liquid to be treated is charged into the vessel and a lower chamber in communication with a liquid outlet. An ion-exchange filtration layer is disposed between the screen main body and the liquid outlet. Ferromagnetic filter elements which form a magnetic filtration layer when magnetized are piled on the screen main body such that the surface of the piled filter elements becomes free. Magnet insertion tubes made of a non-magnetic material vertically extend through the screen main body and a permanent magnet is vertically movably inserted into each magnet insertion tube so that when the permanent magnet is inserted into the magnet insertion tube, the filter elements surrounding the magnet insertion tube are magnetized; but when the permanent magnet is pulled out of the magnet insertion tube, the filter elements are de-magnetized.

5 Claims, 5 Drawing Sheets

DESALTING FILTRATION DEVICE

BACKGROUND OF THE INVENTION

The present invention relates to a desalting filtration device in which a filtration layer serving not only as a magnetic filter but also as a desalting column is disposed within a single vessel.

Steel structures such as various vessels and pipes used in the nuclear power plants, heat power plants, steam generating boiler plants and the like are gradually erroded by condensation and other fluids so that corrosion products (to be referred to as "cruds" in this specification hereinafter) such as particles of iron oxides ($Fe_2O_3$, $Fe_3O_4$ and so on) are produced. As a result, the cruds gradually clog pipes and so-called salts resulting from neutralization reactions between acids and bases are resolved into fluids so that strong electrolytes are produced, thus corroding pipes or the like.

Electromagnetic filters may be used for removal of the cruds through filtration and desalting towers or columns may be used for desalting. So far these electromagnetic filters and desalting columns function independently and are arranged in parallel. Some of the reasons are as follows:

(1) A pressure vessel for accomodating an electromagnetic filter must be made of a non-magnetic steel around which water-cooled exciting coils and ferromagnetic yokes are mounted. On the other hand, a desalting column is made of a different material, i.e., a carbon steel so as to ensure mechanical strength thereof. Thus, combination of the pressure vessel for the electromagnetic filter with the desalting column would result in increase of the costs for welding and assembly.

(2) With a large-diameter pressure vessel for an electromagnetic filter, filter elements are flat and need a greater power for magnetization thereof. Thus, the diameter of the pressure vessel is limitative from the economical viewpoint and it is difficult to match the diameter of the pressure vessel with that of the desalting column.

Meanwhile, the same inventor devised the magnetic filter of the type as shown in FIG. 6 (Japanese Utility Model Application laid open under No. 53210/1983) for the purpose of improving the efficiency of removing the cruds and of reducing the installation area as much as possible. In this magnetic filter, inner tubes 41 partially and liquid-tightly extend through a vessel 1 having a liquid inlet 5 and a liquid outlet 6. The inner tubes 41 are closed at their upper ends as indicated by 42. Filter elements 9 in the form of ferromagnetic particles are in the space in the vessel 1 except the inner tubes 41 and permanent magnets 11 are vertically movable inserted into the respective inner tubes 41. The inner tubes 41 are made of non-magnetic material while the plugs 42 closing the upper ends of the inner tubes 41 are made of a ferromagnetic material. A guide 43 which is a lower portion of each inner tube 41 is made of a ferromagnetic material and is formed integral with the inner tube 41. The filter elements 9 are packed in the space which is defined around the tubes 41 by a pair of vertically spaced yoke-baffle plates 44, in such a way that the movements of the filter elements 9 are so restricted that they are not permitted to flow through the passage openings of the yoke-baffle plates 44. Upon energization of a magnet drive device 21, the permanent magnets 11 are displaced in the tubes 41 above the guides 43, so that the filter elements 9 are magnetized. Under these conditions, a liquid to be treated from a nuclear power plant is charged through the inlet 5 into the vessel 1 so that the cruds are attracted by the filter elements 9.

In order to remove the cruds attracted by the filter elements 9, the drive device 21 is activated so as to lower the permanent magnets 11 into the guides 43. After the filter elements 9 have been de-magnetized in that manner, cleaning water is charged through the outlet 6 into the vessel 1 so as to remove the cruds from the filter elements. The removed cruds are discharged together with the cleaning water through the inlet 5 out of the vessel 1.

The magnetic filter of the type described above with reference to FIG. 6 has not been designed to be stacked one upon another. As a consequence, when a desalting column is stacked, for instance, upon the magnetic filter, the overall height becomes too high.

Therefore, when a magnetic filter and a desalting column are used, they are installed at different locations or juxtaposed and are communicated with each other through pipes. As a result, the desalting-and-magnetic filter combination becomes large in size and consequently a large installation space is required.

The present invention was made to overcome the above and other problems encountered in the conventional magnetic fields and desalting columns.

DETAILED DESCRIPTION OF THE PREFERRED EMBODIMENT

A preferred embodiment of a desalting filtration device in accordance with the present invention will be described in detail with reference to FIGS. 1-5.

Figure 1:
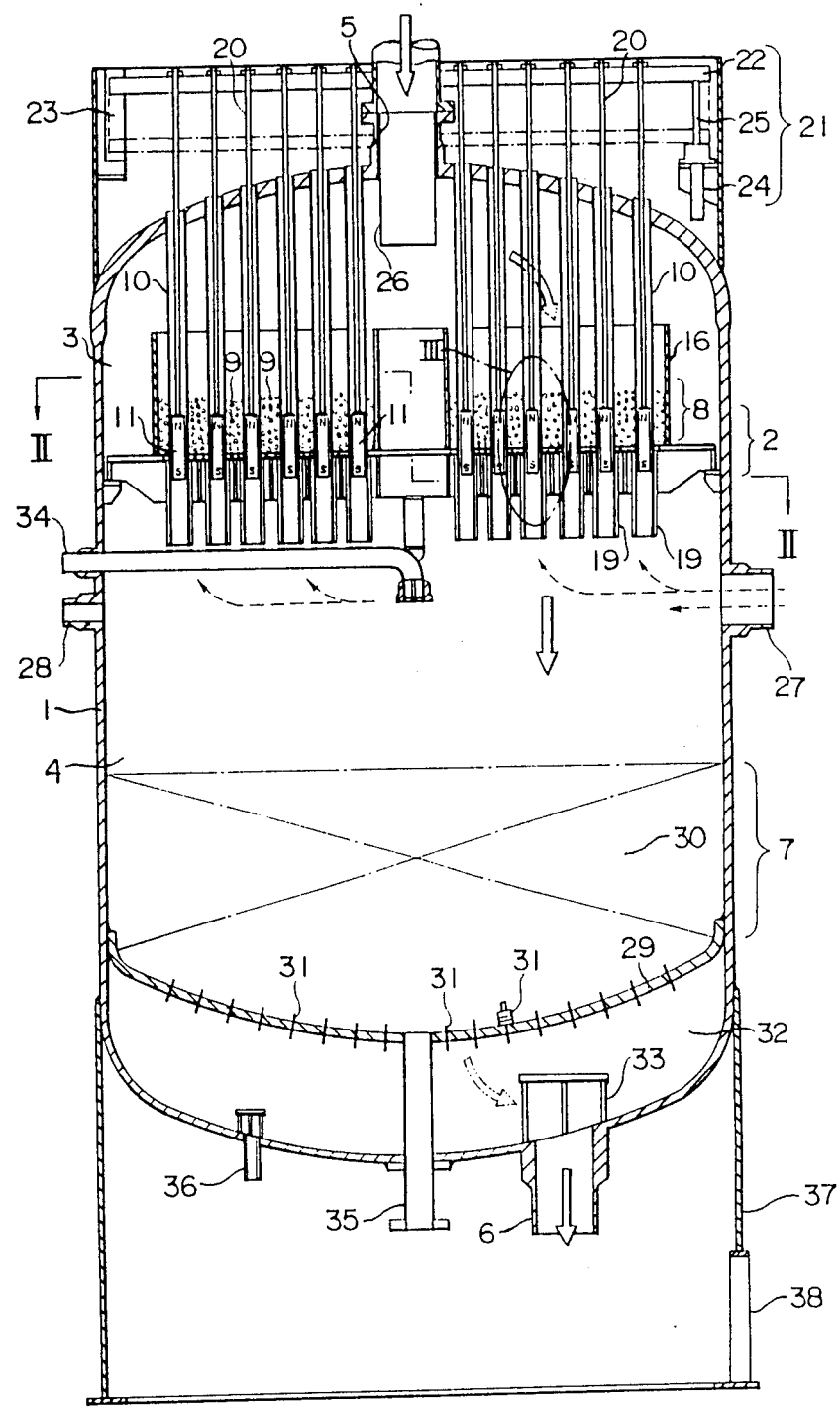
FIG. 1 is a longitudinal sectional view of a desalting filtration device in accordance with the present invention.

As best shown in FIG. 1, a vessel 1 is sectioned into upper and lower chambers 3 and 4 by a first screen main body 2 and has a liquid inlet 5 through which is fed a liquid to be treated and a liquid outlet through which is discharged a treated liquid. An ion-exchange filtration layer 7 is interposed between the screen main body 2 and the liquid outlet 6 so that the lower chamber 4 is defined above the ion-exchange filtration layer 7 while a water collection chamber 32 is defined below the filtration layer 7. It is so designed that the upper half serves as a magnetic filter while the lower half has a function of desalting.

First the upper half serving as a magnetic filter will be described. Filter elements 9 which define a magnetic filtration layer 8 when magnetized are stacked over the screen main body 2 such that the upper surface of the filter elements 9 is free. A plurality of magnet insertion tubes 10 made of a non-magnetic material and having closed lower ends liquid-tightly extend through the filter elements 9 and the upper end plate of the vessel 1.

A permanent magnet 11 is inserted vertically movably into each magnet insertion tube 10 so that when the permanent magnet 11 is lifted, the surrounding filter elements 9 are magnetized; but when the permanent magnet 11 is lowered, the filter elements 9 are de-magnetized.

Figure 2:
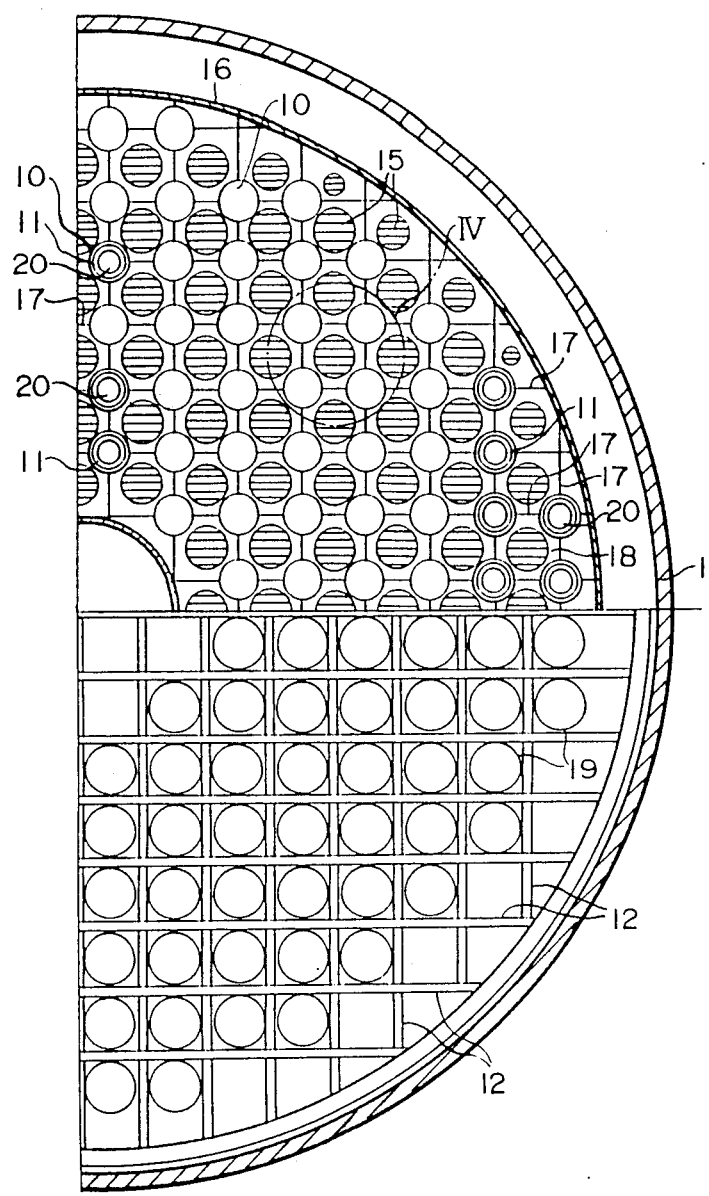
FIG. 2 is a fragmentary sectional view taken along the line II—II of FIG. 1.
Figure 3:
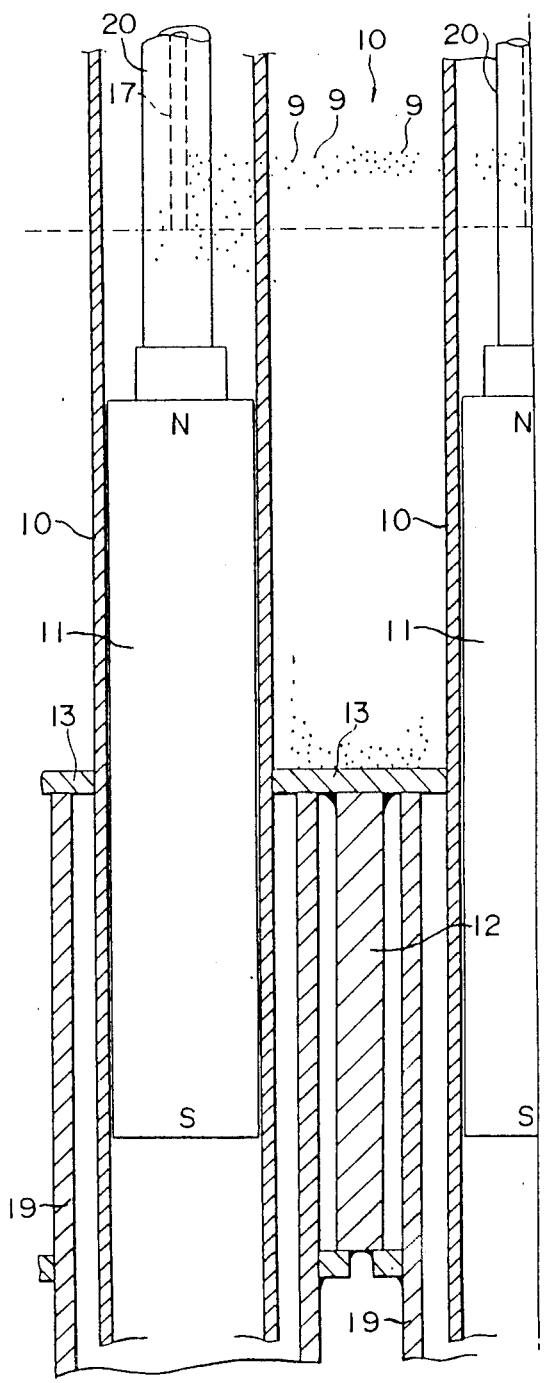
FIG. 3 is a view, on enlarged scale, of a portion indicated by a one-dot chain line III in FIG. 1.
Figure 4:
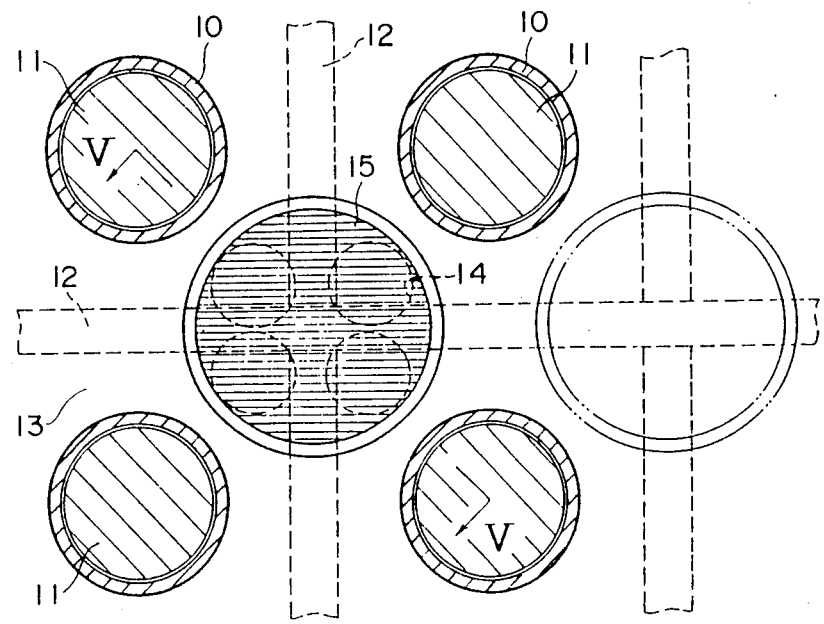
FIG. 4 is a view, on enlarged scale, of a portion indicated by a one-dot chain line IV in FIG. 2.
Figure 5:
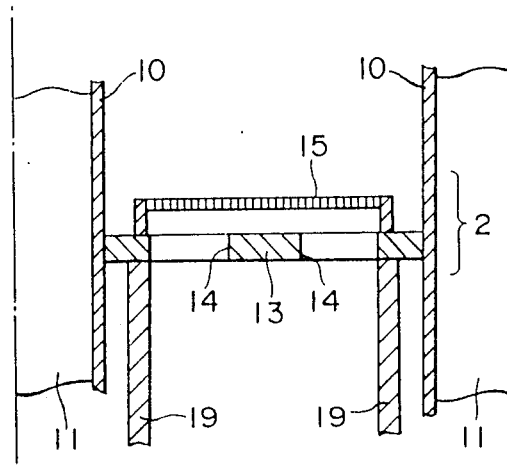
FIG. 5 is a fragmentary sectional view taken along the line V—V of FIG. 4.
Figure 6:
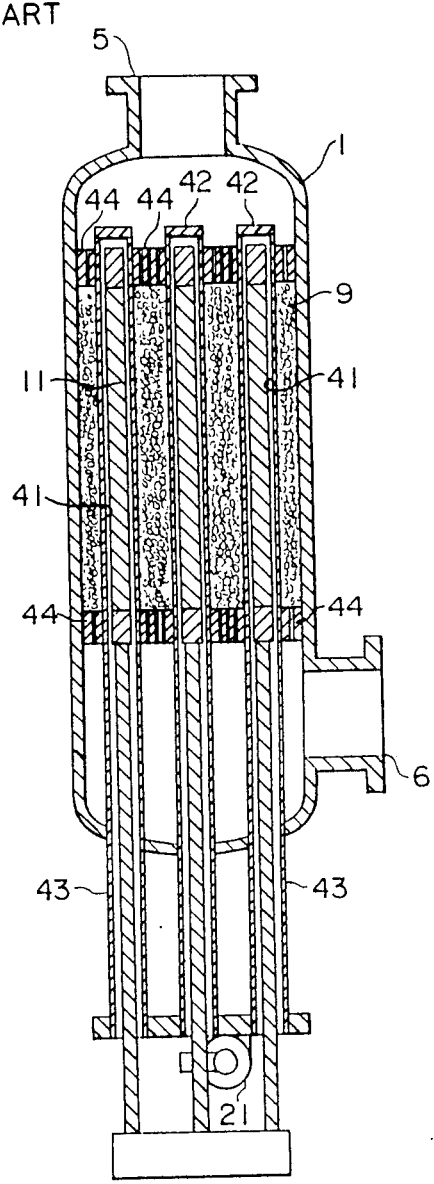
FIG. 6 is a vertical sectional view of a conventional magnetic filter.

The screen main body 2 is arranged as a whole horizontally and a grid plate 12 is attached to the vessel 1 such that, as best shown in FIG. 3, each magnet insertion tube 10 may extend beyond the lower surface of the grid plate 12. Partition plates 13 are disposed upon the upper surface of the grid plate 12 so that the magnet insertion tubes 10 are spaced apart from each other by a suitable distance as shown in FIG. 3. Each partition plate 13 is formed with four holes 14 which are covered by means of a screen plate 15 as shown in FIG. 5. The screen plate 15 has slits or meshes whose size is such that the filter element particles (of diameters ranging from 0.5 to 2 mm, for example) cannot pass through the screen plate 15. As best shown in FIGS. 2 and 4, the screen plate 15 is disposed at the center of the four adjacent magnet insertion tubes 10.

Partitions 17 are disposed above the magnetic filtration layer 8 so as to divide the interior of a ring-shaped side wall 16 like a checkerboard as best shown in FIG. 2 so that the magnet insertion tubes 10 occupy the four corners of each square and vertical insertion passages 18 are defined. The vertical insertion passages 18 are in vertically opposed relationship with the screen plates 15.

Housings 19 made of a ferromagnetic material and adapted to define the magnetic paths of the permanent magnets 11 are disposed at the lower portion of the grid plate 12 and around the magnetic insertion tubes 10. The magnetic circuits are established or interrupted from the exterior.

A rod 20 joined integral with the permanent magnet 11 extends outwardly through the upper end plate of the vessel 1 as shown in FIG. 1 and is operatively coupled to a magnet drive device 21. It should be noted here that all the permanent magnets 11 are simultaneously lowered or lifted. The magnet drive device 21 comprises a lift stand 22 to which are joined integrally the upper ends of the rods 20, guides 23 for vertically guiding the lift stand 22, a power source 24 such as a worm gear or a motor for determining a vertical position of the guides 23 and a transmission mechanism 25 comprising a drive shaft, a reduction gear and other gears interconnecting between the lift stand 24 and power source 24.

An upper screen 26 is interposed between the liquid inlet 5 and the upper chamber 3 and has mesh size to prevent the passage therethrough of the filter elements 9 as in the case of the screen plates 15. The lower chamber 4 is provided with a countercurrent cleansing water inlet 27 and a countercurrent air inlet 28 adapted to clean the filter elements 9.

An end-plate-like supporting plate 29 is disposed in the ion-exchange filtration layer 7 so as to define the lower chamber 4 between the screen main body 2 and the liquid outlet 6 and an ion-exchange resin particle layer 30 is packed on the supporting plate 29. The filtrate flows through a large number of strainers 31 on the supporting plate 29 into the water collection chamber 32 and then is discharged into the liquid outlet 6 via a weir 33 for preventing the whirling of the water. The lower chamber 4 is further provided with a resin inlet 34 for charing the ion-exchange resin particles into the vessel 1 and a resin outlet 35 extends downwardly from the center of the supporting plate 29 through the lower end plate of the vessel 1. Furthermore, the lower end plate of the vessel 1 is formed with an air inlet 36 so as to charge compressed air into the vessel 1, thereby fluidizing the ion-exchange resin particle layer 30.

Reference numeral 37 designates a skirt for supporting the vessel 1; and 38, a manhole fomred through the skirt 37.

In the desalting filtration device with the above-described construction, the filter elements 9 are packed to a position corresponding to upper portions of the magnet insertion tubes 10 as best shown in FIG. 1 and then the magnet drive device 21 is energized so as to insert the permanent magnets 11 into the magnet insertion tubes 10, respectively. Then, a magnetic circuit of each permanent magnet 11 is established between the upper and lower layers of the filter elements 9 which are piled naturally so that the portion between the upper and lower layers is magnetized and consequently the filter elements 9 on the screen main body 2 forms the magnetic filtration layer 8. In this case, as best shown in FIG. 1, almost the upper portion; that is, the upper magnetic pole of the magnet 11 is inserted into the magnetic filtration layer 8 while the lower magnetic pole thereof remains in the corresponding housing 19. As a result, the magnetic field is established between the upper magnetic pole of the permanent magnet 11 and the upper end of the housing 19 so that the filter elements in the magnetic filtration layer 8 are magnetized.

When magnetized, intermagnetization of the filter elements 9 causes the latter to have vertical density higher than that of the filter elements 9 naturally piled. When magnetized, the filter elements 9 become dense in the packed state around the magnet insertion tubes as shown in FIG. 1, so that additional filter elements 9 can be sequentially supplied to the compressed portion for uniformity in density of the magnetic filtration layer 8.

Next the liquid to be treated is charged through the magnetic filtration layer 8 so that the cruds entrained in the liquid to be treated are attracted and trapped. The liquid to be treated which is charged into the vessel 1 through the liquid inlet 5 as indicated by the arrow shown in FIG. 1 flows through the upper screen 26 into the upper chamber 3 as indicated by the arrow. Thereafter the liquid to be treated is divided into a plurality of flows or streams by the vertical insertion passages 18 defined by the partitions 17 so that the liquid to be treated flows substantially uniformly through the magnetic filtration layer 8. After the cruds entrained in the liquid have been attracted and trapped, the liquid flows through the screen plates 15 into the lower chamber 4 as indicated by the arrow and then into the ion-exchange filtration layer 7. As a consequence, the salts dissolved into the liquid which is now free from the curds are trapped in the layer 30. Thus, the treated liquid which flows through the strainers 31 from the layer 30 into the water collection chamber 32 is pure water due to the filtration and the desalting process. The pure water is discharged out of the vessel 1 through the liquid outlet 6.

When the permanent magnets 11 are lowered into the housings 19, magnetic circuits are established between the upper and lower magnetic poles through the side walls of the housings 19 so that no magnetic flux exists in the magnetic filtration layer 8. As a consequence, the filter elements 9 are de-magnetized and become free to move.

Thereafter, as indicated by the broken-line arrows in FIG. 1, the cleansing liquid is charged through the cleansing water inlet 27 into the vessel 1 while the compressed air is charged into the vessel through the air inlet 28. Thus the countercurrent cleansing condition is established. The cleansing liquid and the compressed air charged into the lower chamber 4 rise through the screen main body 2 and fluidize the de-magnetized filter elements 9 to decrease the density thereof and to agitate the filter elements 9. The cleansing liquid is made into contact with the whole surface of each filter elements 9 to separate the de-magnetized cruds on the filter elements 9 from the latter. Thus it becomes possible to discharge the cruds together with the cleansing liquid out of the vessel 1 through the liquid outlet 5. When the filter elements 9 are fluidized in the countercurrent cleansing operation of the type described above, they are agitated mainly in the vertical insertion passages 18 defined by the partitions 17 so that the cleansing effect is enhanced due to the fluidization of the filter elements 9 and the filter elements 9 can be prevented from being scattered beyond the vertical insertion passages 18. In the countercurrent cleansing operation, the upper screen 26 serves to prevent the filter elements 9 from flowing out of the vessel 1 through the liquid inlet 5. It should be noted that the desalting pipe line is shut off in the countercurrent cleansing operation.

When the countercurrent cleansing operation is ended, the fluidized filter elements 9 drop again, forming a natural pile. In this case, the filter elements are guided downward through the vertical passages 18 defined by the partitions 17 to their initial position so that they are uniformly piled and prevented from being scattered.

More particularly, the magnet drive device 21 causes the vertical linear movement of the rod 20 and therefore of the permanent magnet 11. All the permanent magnets 11 are moved vertically in unison with the lift stand 22 in the manner described above so that variations in movement of the permanent magnets 11 becomes less. Furthermore, the switching between the magnetization and de-magnetization of the filter elements 9 can be positively carried out. Moreover, even when the magnetic poles of the magnet 9 are made into contact with the magnet insertion tube 10 during the vertical stroke of the permanent magnet 9 through the magnet insert tube, the so-called contact de-magnetization due to the contact with a ferromagnetic member will not occur since the magnet insertion tube 10 is made of a non-magnetic material.

Meanwhile, in order to regenerate or revitalize the ion-exchange resin particles, pure water and compressed air are charged through the liquid outlet 6 and the air inlet 36, respectively, and the water collection chamber 32 and the strainers 31 into the ion-exchange resin filtration layer 7 to fluidize the packed layer 30. Thereafter the ion-exchange resin particles are discharged out of the vessel 1 through the resin outlet 35 and are regenerated by treating them with a suitable agent. The regenerated resin particles and a liquid (such as water) are fed together through the resin inlet 34 over the supporting plate 29 and piled. Thus, the ion-exchange filtration layer 7 can be repeatedly formed.

As described above, according to the present invention, the vessel of the desalting filtration device is divided into two chambers into which a disposed the filtration layer serving as a magnetic filter and an ion-exchange resin filtration layer for desalting. The former filtration layer comprises magnetizable filter elements piled on the screen main body such that the surface of the piled filter elements is free and when the upper magnetic poles of the permanent magnets are inserted into the magnet insertion tubes extended upwardly through the screen main body, the filter elements are magnetized. Therefore, according to the present invention, the following effects, features and advantages can be attained:

(a) The filtration and desalting of a liquid can be carried out in a single vessel so that the installation space can be reduced.

(b) The liquid to be treated is caused to flow from a liquid inlet through a magnetic filtration layer of magnetizable filter elements and an ion-exchange filtration layer in series. Therefore, a space in the vessel between the magnetic and ion-exchange filtration layers can be used in common so that the increase in height of the desalting filtration device can be reduced to a minimum and the capacity of the desalting and filtration device can be easily increased.

(c) The interior of the vessel is divided into the magnetic filtration layer and the ion-exchange filtration layer as described above and these two filtration layers are arranged in series. As a result, the desalting filtration device can be made simple in construction and less expensive because a pipe line system interconnecting between these two filtration layers can be eliminated. Furthermore, almost all the cross sectional area of the vessel can be used as a filter surface so that the pressure loss can be minimized in operation.

(d) When the filter elements are magnetized, they are attracted by each other so that their density is increased. Even when the magnetic filtration layer is compressed due to the increase in density of the magnetic filter elements, additional magnetic filter elements are naturally supplied to the upper portion of the magnetic filtration layer so that the density of the magnetic filtration layer can be maintained uniformly.

(e) When a magnetic drive device is so energized that permanent magnets are pulled out of the magnetic filtration layer, the magnetic filter elements are de-magnetized and become free to move upwardly. As a result, the magnetic filter elements can be fluidized in the countercurrent cleansing operation so that cleansing efficiency can be much enhanced.

(f) Each permanent magnet is surrounded by or inserted into the magnet insertion tube such that the magnetic poles of the permanent magnet will not be made into contact with any ferromagnetic member or structure so that the so-called contact de-magnetization of the permanent magnet can be avoided.

What is claimed is:

1. An apparatus for filtering and desalting water, comprising: a vessel having an inlet for water to be treated at a top portion thereof, and an outlet for treated water at a bottom portion thereof; a screen body below said inlet; a magnetic filtration layer on said screen body for filtering the water; an ion exchange filter layer below said screen body for desalting water; and a water collection chamber below said ion exchange filter layer and above said outlet.

2. An apparatus according to claim 1, wherein filter elements in the form of ferromagnetic particles are piled upon said screen body which has through holes smaller in size than said particles such that surfaces of the piled filter elements become free, and means for magnetizing the filter elements being attached to the screen body.

3. An apparatus according to claim 2, wherein magnet insertion tubes made of a non-magnetic material extend through the filter elements and said screen body and through the top portion of said vessel upwardly, upper ends of said magnet insertion tubes being open, and permanent magnets being vertically movably inserted into respective magnet insertion tubes.

4. An apparatus according to claim 3, wherein a lower end of each magnet insertion tube is joined to a ferromagnetic cylindrical housing which extends through said screen body downwardly.

5. An apparatus according to claim 2, wherein a ring-shaped side wall is installed on said screen body, said ring-shaped side wall being interiorly divided into a plurality of sections by partitions, the filter elements being packed into the space defined by said ring-shaped side wall.

* * * * *

UNITED STATES PATENT AND TRADEMARK OFFICE
CERTIFICATE OF CORRECTION

PATENT NO. : 4,750,998
DATED : June 14, 1988
INVENTOR(S) : Michishige Nakamura

It is certified that error appears in the above-identified patent and that said Letters Patent are hereby corrected as shown below:

Title page, item [75] should read

[75] Inventor: Michishige Nakamura, Tokyo, Japan

Item [19] should read --Nakamura--

Signed and Sealed this

First Day of November, 1988

Attest:

DONALD J. QUIGG

Attesting Officer

Commissioner of Patents and Trademarks